United States Patent
Sürig

(10) Patent No.: US 11,563,321 B2
(45) Date of Patent: Jan. 24, 2023

(54) INTRINSICALLY SAFE ENERGY TRANSMISSION UNIT FOR SUPPLYING AN ELECTRICAL DEVICE WITH INCREASED POWER

(71) Applicant: Dräger Safety AG & Co. KGaA, Lübeck (DE)

(72) Inventor: Andreas Sürig, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 295 days.

(21) Appl. No.: 17/071,520

(22) Filed: Oct. 15, 2020

(65) Prior Publication Data

US 2021/0119433 A1 Apr. 22, 2021

(30) Foreign Application Priority Data

Oct. 21, 2019 (DE) ..................... 10 2019 007 297.9

(51) Int. Cl.
*H02H 9/00* (2006.01)
*H02J 3/04* (2006.01)
(Continued)

(52) U.S. Cl.
CPC ............ *H02H 9/008* (2013.01); *H01B 9/006* (2013.01); *H02B 1/20* (2013.01); *H02H 1/04* (2013.01);
(Continued)

(58) Field of Classification Search
CPC ............ H02H 9/008; H02H 1/04; H02H 9/02; H02H 9/04; H01B 11/002; H01B 11/02;
(Continued)

(56) References Cited

U.S. PATENT DOCUMENTS

2016/0248241 A1 8/2016 Kancel
2020/0035380 A1* 1/2020 Tokumoto ............ H05K 9/0098

FOREIGN PATENT DOCUMENTS

CN 205194370 U 4/2016
CN 107534290 A 1/2018
(Continued)

OTHER PUBLICATIONS

TRGS 723—Seite 2 von 34 (Fassung Aug. 26, 2019); Ausschuss für Gefahrstoffe—AGS—Geschäftsführung—BAuA—www.baua.de/ags; paragraphs 5.5.4.2.3 and 5.5.4.2.5, p. 17 (full document included).

*Primary Examiner* — Ryan Johnson
(74) *Attorney, Agent, or Firm* — McGlew and Tuttle, P.C.

(57) ABSTRACT

A safe energy supply unit (1) and system, for supplying an electrical device (8) in an explosion-proof area, transmits power from an energy source (9), including a plurality of galvanically isolated individual sources, with a multiple line connection (2) with a plurality of galvanically isolated and individually shielded conductor pairs (31, 32, 33, 34). A collector device (4), in an explosion-proof jacket (5) at an end of the multiple line (3), has uncoupling devices (45) for the galvanically isolated conductor pairs and a combiner circuit (47, 49) that combines the transmitted electric power from each line into a global power. The global power is outputted at an output (48) of the collector device to the electrical device. The conductor pairs allow for an increased global power, which is scalable, safely transmittable, with standard, conductor pairs. The electrical device is intrinsically safely supplied with high power with minimal effort.

20 Claims, 7 Drawing Sheets

(51) Int. Cl.
    *H02B 1/20*         (2006.01)
    *H02H 7/26*         (2006.01)
    *H02H 9/04*         (2006.01)
    *H02J 7/00*          (2006.01)
    *H02J 4/00*          (2006.01)
    *H02H 1/04*         (2006.01)
    *H01B 9/00*          (2006.01)

(52) U.S. Cl.
    CPC .............. *H02H 7/26* (2013.01); *H02H 9/042* (2013.01); *H02J 3/04* (2013.01); *H02J 4/00* (2013.01); *H02J 7/00712* (2020.01)

(58) Field of Classification Search
    CPC ....................... H01B 9/00; H01B 9/006; G05B 2219/24028; H02J 4/00
    See application file for complete search history.

(56)                 References Cited

FOREIGN PATENT DOCUMENTS

| CN | 109937459 A | 6/2019 | |
|----|----|----|----|
| CN | 209119755 U | 7/2019 | |
| DE | 10152653 A1 | 4/2003 | |
| GB | 2094572 A * | 9/1982 | ............. H02H 9/008 |
| RU | 2658308 C2 * | 6/2018 | |

\* cited by examiner

INTRINSICALLY SAFE ENERGY TRANSMISSION UNIT FOR SUPPLYING AN ELECTRICAL DEVICE WITH INCREASED POWER

CROSS REFERENCE TO RELATED APPLICATIONS

This application claims the benefit of priority under 35 U.S.C. § 119 of German Application 10 2019 007 297.9, filed Oct. 21, 2019, the entire contents of which are incorporated herein by reference.

TECHNICAL FIELD

The present invention pertains to an intrinsically safe energy transmission unit for supplying an electrical device with increased power, which unit is suitable for potentially explosive areas. It comprises a line connection and is configured for the intrinsically safe transmission of electrical power via the line connection from an energy source to the electrical device.

TECHNICAL BACKGROUND

Electrical devices are used in special applications in potentially explosive areas, for example, where combustible gases, dusts or other explosive substances may be present. In order to avoid a potential explosion, neither the electrical device nor its energy supply may form an ignition source for an explosion. Devices installed or located in potentially explosive areas must be built to this end according to defined types of protection "e."

The rules of explosion protection defined in relevant national and international standards and guidelines specify different types of protection "e," to which electrical devices are classified depending on the particular applicable explosion protection. The application of the type of protection "intrinsic safety," abbreviated by the symbol "Ex-I," is advantageous in many cases. Voltages, currents and power are limited in this type of protection such that no igniting sparks or hazardous increases in temperature can develop. The limitation is selected here to be such that the minimum energy and ignition point of an explosive mixture will not be reached. Intrinsically safe electrical operating materials contain only circuits that meet the requirements imposed on intrinsically safe circuits. Only circuits with low power can come into consideration for intrinsically safe circuits. Voltages, currents and power are limited here such that no sparks capable of generating ignition or hazardous temperature increases can develop. There are two technical configurations in this connection, namely, "Ex ia" and "Ex ib." "Ex ia" offers an especially high level of safety, and "Ex ib" offers a high level of safety. The technical configuration is described, for example, in the standard IEC 60079-11.

Because of the limitations imposed in respect to voltages, currents and correspondingly also to power, the supply of sensors over long lines has proved, among other things, difficult, especially when these require more than the power that is allowable from the viewpoint of safety engineering. Depending on the particular concrete values for current, voltage, line coatings and other device parameters, the power is frequently limited in practice to values in the range of about 2 W in the case of the type of protection "Ex ia."

If an output higher than the permissible output according to the standard IEC 60079-11 at a given voltage and current level is needed to supply an electrical device, the application of the method mentioned in the standard IEC 60079-39 offers a remedy. This method makes provisions for the detection of a short circuit or of an interruption of the line and for then interrupting the introduction of energy before an explosion can develop. The method requires a comparatively great effort. Because of the electronic current limitations, auxiliary circuits and uncoupling networks needed for this, only the lower type of protection "Ex ib" is reached. It does not, as a rule, represent a solution for the higher type of protection "Ex ia."

There is a need for an intrinsically safe supply, with which electrical devices with a power drain higher than that which can be transmitted conventionally in an intrinsically safe manner can be supplied with power continuously and sufficiently.

SUMMARY

Based on this, an basic object of the present invention is to increase an intrinsically safe energy transmission of the type mentioned in the introduction in terms of the power that can be transmitted.

In an intrinsically safe energy transmission unit, which is suitable for an explosion-proof area (a potentially explosive area) for supplying an electrical device, which unit comprises a line connection and is configured for the intrinsically safe transmission of electric power via the line connection from an energy source with a plurality of galvanically isolated individual sources to the electrical device, provisions are made according to the present invention for the line connection to be configured as a multiple line with a plurality of galvanically isolated and individually shielded conductor pairs for the connection to the individual sources, and for a collector device, which is configured as an explosion-proof device in an explosion-proof jacket and has terminals of its own for the galvanically isolated conductor pairs as well as a combiner circuit, to be arranged at the electrical device-side end of the multiple line, wherein the terminals are provided with uncoupling devices in the collector device, which prevent a reaction to the connected conductor pairs, and the combiner circuit is configured to combine the electric power transmitted from the galvanically isolated conductor pairs at the terminals into a global power, wherein the global power is outputted at an output of the collector device to the electrical device.

The present invention is based on the idea of supplying an electrical device with an enormously high power nevertheless in an intrinsically safe manner from a suitable energy source by the power transmission being carried out via a plurality of galvanically isolated and individually shielded conductor pairs, wherein the respective individual power transmitted via the individual conductor pairs are combined after the uncoupling device into a global power for being outputted to the electrical device. "Enormously high" means here that a higher power is present than can be transmitted in an intrinsically safe manner through a singular line. The limit value is the permissible power specified at a given voltage and current level according to IEC 60079-11. However, the individual conductor pairs and their supply by an energy source, especially by an individual energy source, are not sufficient in terms of output. By fanning out the power to be transmitted among a plurality of conductor pairs, it is possible to transmit a power, which can be scaled in itself as desired, in an intrinsically safe manner, doing so with the use of usual, standard conductor pairs for the intrinsically safe transmission, for example, according to the standard IEC 60079-25. An intrinsically safe supply even of an electrical device with an enormously high power is thus made possible with little effort. This is especially true if the individual conductor pairs are connected to a corresponding plurality of galvanically isolated individual sources of the energy source, the individual sources being current- and/or voltage-limited, especially power-limited, according to IEC 60079-11. It is thus possible thanks to the present invention to create a line connection that meets especially the requirements of the standard IEC 60079-25 and nevertheless supplies an electrical device in an intrinsically safe manner with an enormously high power.

A power limitation is defined within the framework of the present invention as a limitation of current and voltage. Such a limitation arises from the standard specifications and inevitably leads to a corresponding limitation of the power. However, the present invention allows basically the presence of an especially high overall power while the standard specifications are complied with. A separate limitation of the power would not therefore arise according to the present invention from viewpoints of safety engineering, but, for example, from a property or function of the load, especially of the electrical device, which property is not relevant from the viewpoint of safety engineering.

A special advantage of the present invention is that this higher power transmission requires comparatively little effort and does not, in particular, require a complex electronic system. This is true especially compared to the process specified according to the standard 60079-39, which is mentioned in the introduction. The present invention offers the further advantage that a higher level of reliability can be attained due to the lower effort, especially due to a less complex electronic system.

Further, an especially high level of safety, with which even the type of protection "Ex ia" can be met, can be attained, even if the circuits of the individual conductor pairs are limited in terms of current by passive components, such as resistors.

The energy transmission according to the present invention via the plurality of galvanically isolated conductor pairs remains intrinsically safe even in case of errors, such as in case of damage to the line connection due to mechanical effect or due to failure of the insulation. If, for example, a conductor is damaged as a consequence of being cut, one conductor pair is cut first, then the next one, etc. The shielding is cut now first by the cutting tool, then a first conductor of the conductor pair, then a second conductor of the conductor pair, and finally the rest of the shielding, and, assuming a conductive cutting edge, the shielding is connected in the worst case to the first conductor and the first conductor is then connected to the second conductor of the conductor pair. Since the individual conductor pairs transmit basically only a low power, which is harmless from the viewpoint of safety engineering, in case of an intrinsically safe energy transmission, only a current flow that is harmless from the viewpoint of safety engineering will develop in case of a short circuit as well. This sequence is repeated subsequently for the other conductor pairs. It is decisive that the individual conductor pairs are cut consecutively during the cutting, so that only the current of one individual source is interrupted at the same time and never the sum of the currents from a plurality of individual sources. Since the cutting through is always safe in itself in case of an individual source, the consecutive cutting of the line connection according to the present invention does not consequently lead to an ignition. The case of cutting through is correspondingly safe in all conceivable scenarios based on the shielding used. The case may be more critical when tearing occurs. In the worst case, n−1 return conductors of n conductor pairs are interrupted here in the worst case, and the sources are galvanically connected to one another, for example, by a source-side, common ground. In case of a simultaneous interruption, the current of all n conductor pairs would then flow through the only remaining return conductor. If this is likewise interrupted later, the n-fold current is isolated, which could then lead to an ignition spark. This can be avoided by a galvanic isolation of the individual sources, so that safety is created in this respect. Finally, there still is the case of failure of the insulation to consider. The insulation of a line connection may fail, in principle, for various reasons, e.g., due to physical overstressing, especially as a consequence of pressure, temperature and/or UV radiation, or due to disintegrations due to chemical effects. Due to the elimination of the insulation, only a short circuit will always develop here through the shielding between the two conductors of a conductor pair in the interior of the shielding braiding. The short circuit current thus remains limited to the intrinsically safe level of the current through a conductor pair. A hazardous addition of currents cannot thus occur.

A circuit defined as "intrinsically safe" is one in which no spark and no thermal effect, which occurs under the testing conditions specified in the standard, is able to cause an ignition of a potentially explosive atmosphere of a defined, standardized composition. Thus, the power is always limited in the "intrinsically safe" type of protection, specifically such that only a release of energy that is harmless from the viewpoint of safety engineering can occur due to the spark generated in case of a short circuit. This is also called "ignition protection" or "ignition-protected." This is a measure of secondary explosion protection, which is referred to by the designation "explosion-proof." These definitions are technical and are contained in the relevant standards, for example, in the standard class IEC 60079, especially in the standard parts -11, -14, -25.

"Non-fault-liable" is a technical term that is used in the relevant standards related to the intrinsic safety for rating components and component groups. For example, Zener diodes for voltage limitation and other semiconductor components are generally considered to be fault-liable, whereas film resistors or wire resistors for current limitation are considered to be non-fault-liable components under certain standard specifications.

However, not only do the energy transmission according to the present invention and especially also the energy source thereof preferably have an intrinsically safe configuration, but the electrical device itself also has an explosion-proof configuration according to a standardized type of protection, preferably according to Ex is or Ex ib. An intrinsically safe chain may especially preferably be formed up to and including the electrical device for the power supply as well as for the energy consumption.

The collector device and/or the combiner circuit are advantageously sealed and/or arranged in a pressure-proof housing. Due to the sealing or the arrangement in a pressure-proof housing, an especially good protection is achieved for this critical area, in which the power flowing over the plurality of conductor pairs is combined. Potentially explosive gases cannot reach the circuit carrying the full power at all because of the sealing; the pressure-proof housing would otherwise act as a securing containment in case of an error.

The uncoupling devices preferably have redundantly configured uncoupling elements. The redundancy ensures a higher level of operational reliability, because the uncoupling function is preserved even in case of a defect of one of the uncoupling elements. For further simplification, the uncoupling elements are configured as preferably passive components, as a result of which they can have a higher level of reliability than active components. The current valves are connected here in their respective uncoupling device in a series connection, which is not fault-liable. A fail-safe process can thus be achieved in case of failure of one or more of the current valves: The desired functionality is still always achieved in case of the series connection in case of an otherwise critical short circuit of the current valve.

The combiner circuit is preferably configured to combine the currents transmitted by the conductor pairs, preferably as a parallel circuit. The individual currents being transmitted by the individual conductor pairs can thus be combined into a global current with a less complicated circuitry and therefore in a reliable manner because a smaller number of components are required. However, the combiner circuit may, as an alternative, also be configured, preferably as a series connection, such that the individual voltages of the respective conductor pair are interlinked to form a higher overall voltage. A higher supply voltage can thus be reached for the electrical device in a both simple and elegant manner.

A current limitation and/or a power limitation are advantageously provided for the conductor pairs. As a rule, an intrinsically safe energy source will have a limitation anyway, be it in terms of the current, voltage and/or power. However, it may nevertheless be advantageous, especially from the viewpoint of the redundancy or broader usability, for example, with other, not correspondingly limited energy sources, that the energy transmission unit has a current limitation and/or power limitation of its own, x especially in and/or at the beginning of the line connection, in the collector device and/or on the energy source-side of the line connection. An especially simple as well as expedient configuration of the current limitation may be embodied by means of a resistor. A resistor may be used combined with an additional final control element for a simple embodiment of a power limitation, also from a property or function of the load, which is not a property or function that would be safety-relevant from the viewpoint of safety engineering. Thus, a resistor may be provided at the beginning of the conductor pairs, be it as a beginning part of the conductor pairs or be it arranged upstream, in order thus to achieve the desired limitation over the entire extension of the conductor pairs. It is also possible, however, in addition or as an alternative, to make provisions for the current limitation and/or the power limitation, for example, the resistor, to be configured such that it is arranged in the collector device or is integrated in the energy source. The line connection with its conductor pairs itself can thus remain free from additional limitation components, which simplifies the structural configuration. The power limitation of the conductor pairs is preferably selected to be in the range of 1.5 W to 2.5 W.

The electrical device is advantageously configured as a field device, especially as an active sensor, telemetry device, communication device, final control element and/or controller of a technological plant. Further, the electrical device may have a battery of its own, either to increase the failure safety or as an additional power supply.

The collector device is preferably provided with a voltage controller, which is configured to adjust and/or to limit the voltage present at the terminal of a conductor pair to a predefined value, the voltage controller preferably having an intrinsically safe configuration, especially in shunt topology. A regulated output voltage of the collector device can thus be achieved. This is not only advantageous for the supply of electrical devices that expect to have a stabilized supply voltage, but it can also be used, for example, to charge batteries for the electrical device. The voltage controller itself preferably likewise has an intrinsically safe configuration itself. In particular, the voltage controller is also sealed in case of a sealed configuration of the collector device. The configuration in shunt topology makes it possible, unlike in case of a usual longitudinal controller, to obtain an intrinsically safe embodiment according to "Ex ia." Further, the voltage of the battery can be limited by means of the shunt controller with the use of the line and internal resistance of the energy sources. A final control element of the voltage controller is advantageously arranged here in the line in front of the uncoupling device. This offers the advantage that it "sees" only the power from the own source, but it does not "see" the power from a battery possibly arranged in the electrical device.

It is especially advantageous if a limitation of the maximum battery voltage of the battery shall be achieved by means of the shunt controller. A limiter circuit is provided, which is configured to end or at least temporarily interrupt the charging of the battery when a predefined threshold, for example, the maximum voltage of the battery, is reached.

Furthermore, a release circuit, which is configured to carry out the charging process of the battery only when this has a certain predefined minimum voltage, may preferably be provided in the electrical device for protecting the battery.

Further, provisions are preferably made for a respective voltage controller of its own to be associated with the terminals. This makes it possible to split the power loss among the individual voltage controllers, i.e., into n small portions in case of n voltage controllers on n conductor pairs. In addition, a mutual influence of the different terminals on one another is avoided. Further, the arrangement of the voltage controllers in the collector device has the advantage that the power loss thereof is generated there rather than in the possibly more heat-sensitive electrical device.

Ground lines of the conductor pairs are advantageously insulated in the conductor connection and are merged only in the collector device, preferably within the ignition-proof jacket, or are passed through the collector device in order to be merged only in the electrical device. They are preferably merged to a non-fault-liable ground potential ("GND"). The merging of the individual conductor pairs takes place here completely only within the combiner circuit of the collector device or even only in the electrical device to be supplied.

The conductor pairs are preferably arranged in a common jacket. This simplifies the guiding and the protected arrangement of the line connection. Further, the line connection is preferably provided with a shielding, said shielding being preferably grounded on one side, especially on the source side. Interfering electromagnetic effects can be attenuated by the shielding grounded on one side and a potential entrainment over the shielding, which is harmful from the viewpoint of safety engineering, is ruled out.

Further, a potential guard may optionally be provided at the conductor connection. It is preferably configured to monitor the voltages of the individual supply circuits. Further, an insulation monitor may be provided, which is configured to detect a short circuit in and/or between conductor pairs and to limit a current flow through these conductor pairs in case of a detected short circuit. An effective monitoring of the operational reliability of the energy transmission unit can be achieved with a potential monitor and/or insulation monitor.

The present invention extends, furthermore, to an intrinsically safe energy supply system suitable for supplying an electrical device in the explosion-proof area comprising an energy source and an energy transmission unit, as described above. For further details on the energy transmission unit, reference is made to the above description.

It should be noted in reference to the energy source that it comprises a plurality of individual sources, wherein one individual source each is assigned to one of the conductor pairs and is galvanically isolated from the other individual sources. The energy source and/or the individual sources thereof are preferably current- and/or voltage-limited, and they preferably have for this an output resistor. The limitation of current and voltage, which is desired for the intrinsic safety, to values that are harmless in terms of safety engineering and a corresponding limitation of the power that can be transmitted per individual conductor pair can thus be achieved in a suitable manner. A redundant electronic current limitation unit comprising active components, for example, by a transistor circuit, is also possible for applications that require only a protection according to "Ex ib."

It should be noted in reference to the electrical device that the collector device may optionally be integrated into the electrical device, or conversely, the electrical device may be integrated into the collector device, and the electrical device is preferably a field device, especially an active sensor, final control element or a controller of a technological plant. It is useful especially in an electrical device with high power drain to carry out the merging by means of the collector device only where it is necessary to avoid needlessly long transmission sections with already combined currents and/or combined voltage.

The electrical device preferably has a battery, preferably with an integrated charge controller for the battery, and the charge controller is further configured preferably as a voltage-controlled charge controller. The present invention can thus be used to charge a battery of the electrical device or else also to clamp the battery voltage. Furthermore, a limiter circuit is preferably provided here, which is configured to end the charging of the battery when a predefined threshold value, especially a maximum voltage, is reached.

The present invention will be described below as an example on the basis of advantageous embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
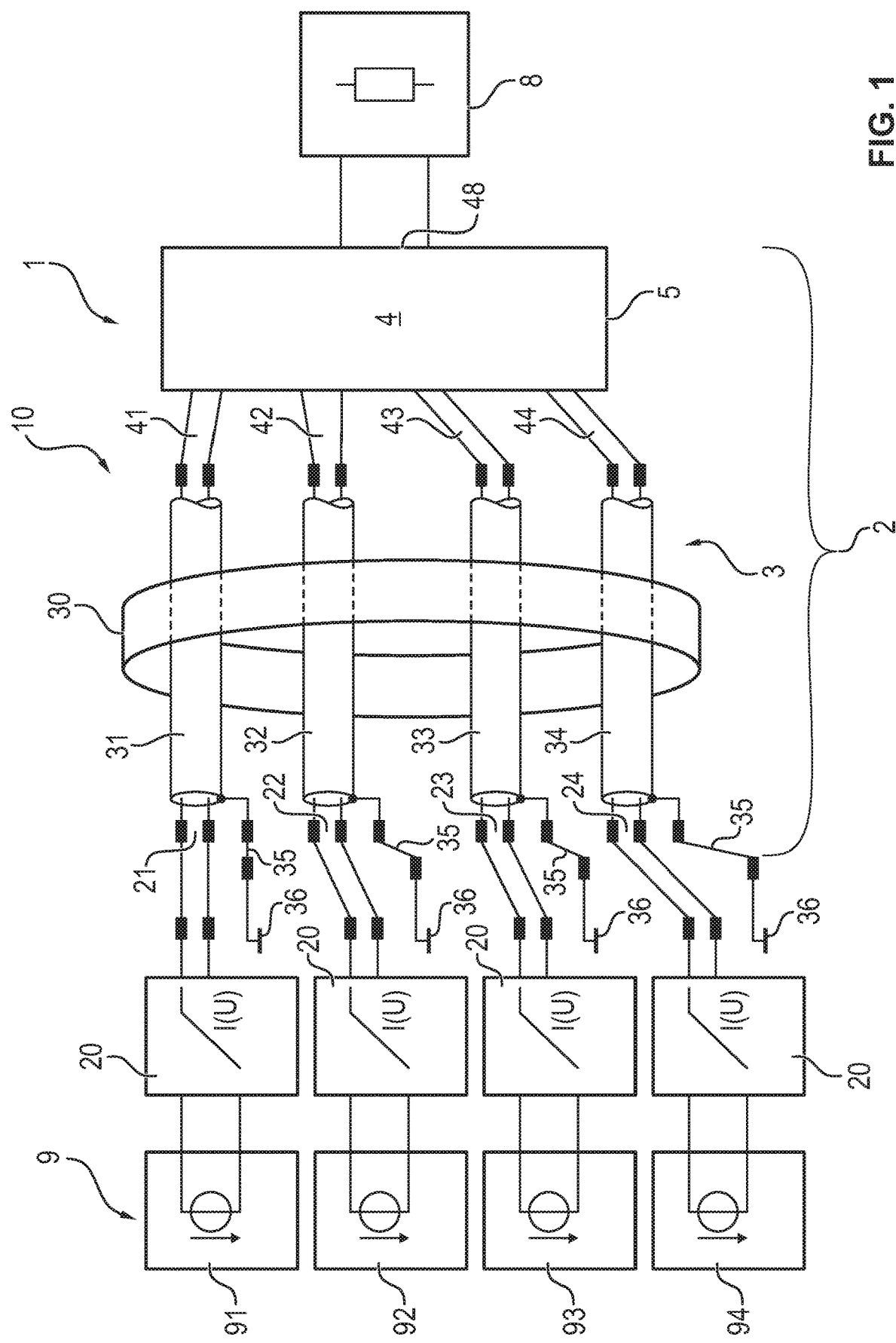
FIG. 1 is a schematic view of an intrinsically safe energy supply system.

Referring to the drawings, a schematic view of an example for an intrinsically safe energy transmission system 10 according to the present invention is shown in FIG. 1. It comprises as the main components an intrinsically safe energy transmission unit 1 for supplying an electrical device 8 as a load, wherein the necessary power is fed by an energy source 9 into the energy transmission unit 1.

The energy transmission unit 1 comprises a line connection 2 with a multiple line 3, which has a plurality of conductor pairs 31-34. Four conductor pairs are shown as an example in FIG. 1, but there may be 2, 3 or 5 and more conductor pairs as well. They are provided each with a shielding 35 of their own and are arranged in a common jacket 30. The shielding 35 is at ground potential 36 in this embodiment on one side, namely, on the source side, i.e., on the side of the energy source 9.

The line connection 2 has a plurality of input terminals 21, 22, 23, 24, and the number thereof is identical to the number of the conductor pairs 31, 32, 33, 34. An energy source 9 with a plurality of galvanically isolated individual sources 91, 92, 93, 94 is connected to the input terminals 21, 22, 23, 24, one of the energy sources 91-94 being assigned to each of the terminals 21-24. A limiting device 20, which may be configured as a current limitation or a voltage limitation (as a passive resistor in the simplest case), is shown at the beginning of each of the conductor pairs 31-34. The limiting device 20 limits the current and/or the voltage in each of the conductor pairs 31-34 to intrinsically safe levels. How high these levels are is obtained from the relevant standards and is correspondingly determined by the person skilled in the art. Individual power below 3 W, mostly in the range of 1.5 W to 2.5 W, are typically obtained from this for each of the conductor pairs 31-34.

The other end of the multiple line 3 is connected to a collector device 4. The collector device 4 has to this end a plurality of terminals 41, 42, 43, 44, to which the ends of the conductor pairs 31, 32, 33, 34 are connected. The collector device 4 merges the power individually transmitted via the individual conductor pairs 31-34 into a global power. Because of the higher currents/voltages developing in the process, the collector device 4 is arranged in a pressure-proof housing 5 for protection. As an alternative or in addition, the collector device 4 is arranged under a seal 50 (see FIGS. 3 through 5). The global power thus formed is made available at an output 48 of the collector device 4, to which the electrical device 8 to be supplied is connected as a load.

Figure 2:
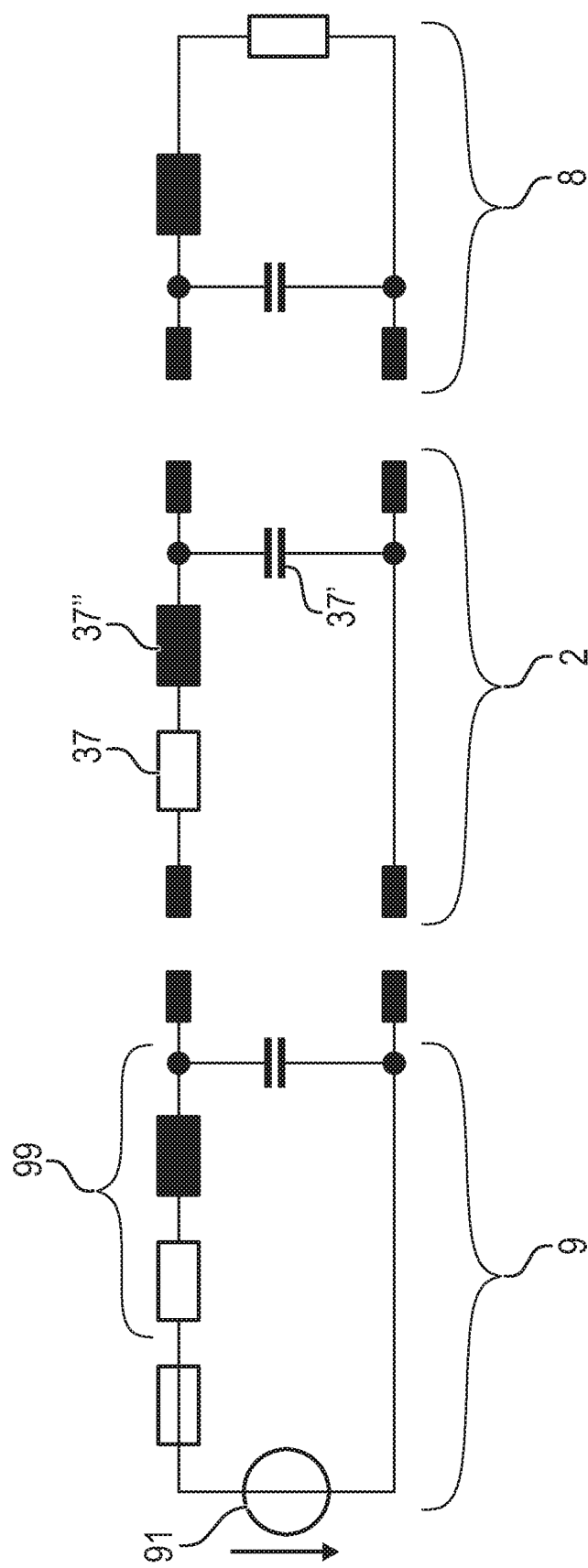
FIG. 2 is an electrical equivalent circuit diagram for FIG. 1.

An electrical equivalent circuit diagram is shown in FIG. 2. The energy source 9, whose output resistance is symbolized by an impedance 99, is seen in the left-hand part of the figure. This impedance 99 limits the maximum current that can be taken from the source 91 and thus indirectly also the power that can be drained. To this is connected the line connection 2 with a line resistance 37 arranged in the conductor pair as well as with the line capacity 37' and with the line inductance 37". The collector device 4 is not shown in FIG. 2 because it is electrically transparent in this respect. Finally, the termination is formed by the electrical device 8 as a load.

Figure 3:
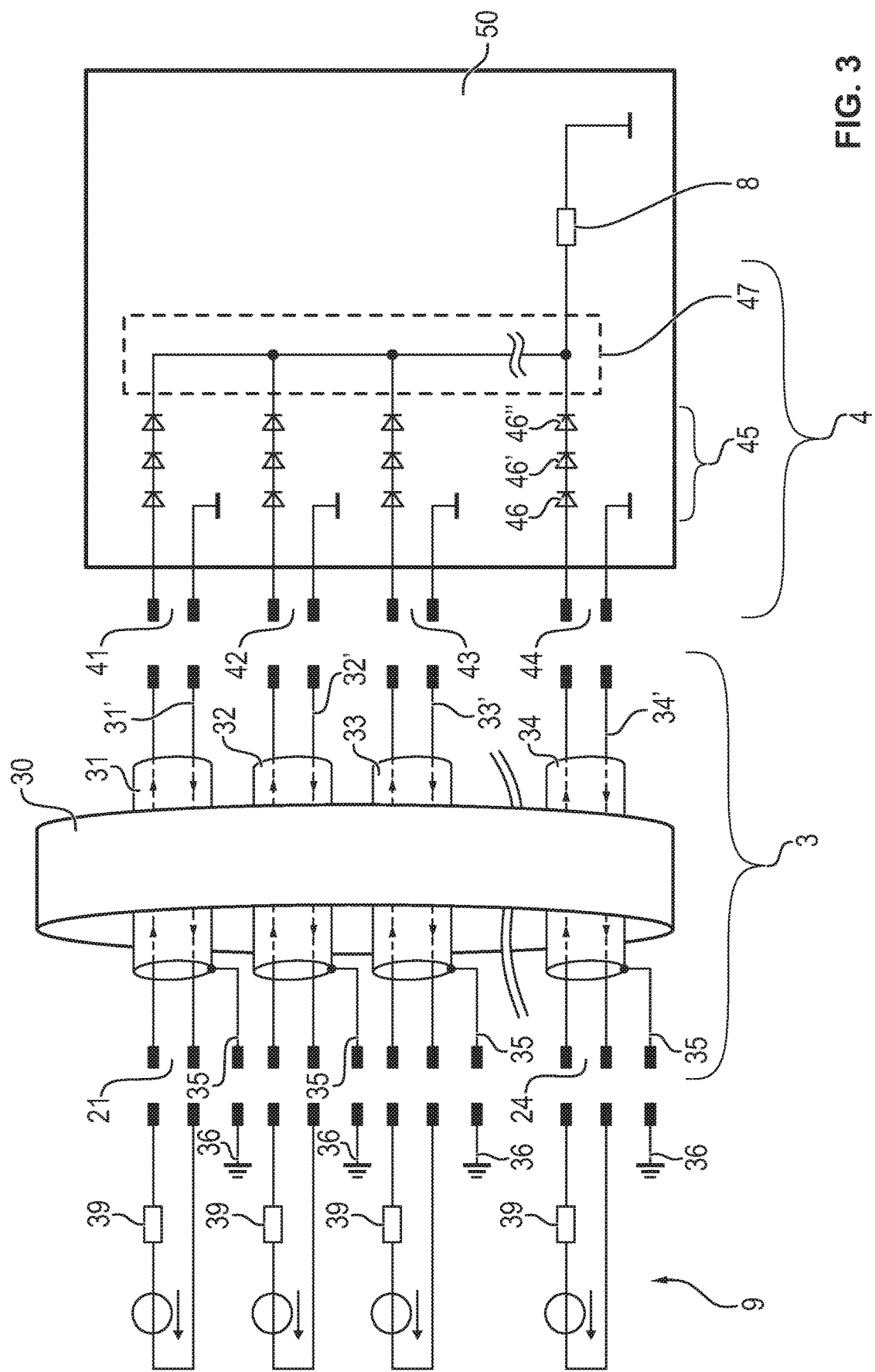
FIG. 3 is a schematic view of a schematic view of a schematic view of a first embodiment with merging of the currents.

A first embodiment is shown in FIG. 3. It is configured such that a merging of the current being transmitted in the individual conductor pairs 31-34 takes place. The collector device 4 is provided to this end with a combiner circuit 47. To this are connected the terminals 41-44 via an uncoupling device 45. Each of the uncoupling devices 45 contains for reasons of redundancy a plurality of uncoupling elements 46, 46', 46", which are configured in the exemplary embodiment shown as three diodes connected in series. The uncoupling elements 46, 46', 46' act as current valves and carry the current being transmitted by the respective conductor pair 31-34 to a combiner circuit 47. This combiner circuit 47 is configured in the embodiment shown such that the combiner circuit 47 connects the individual currents in parallel and adds them up to a global current. The global current thus formed can be outputted to the load formed by the electrical device 8, which load is installed in an integrated form in this exemplary embodiment combined with the collector device 4 under a common seal 50.

The current limitation 20 is configured in the embodiment of FIG. 3 in a simplified form, differently from that shown in FIG. 1, namely, as a limiting resistor 39 arranged downstream of the individual sources 91-94 at the beginning of the line connection 2.

Figure 4:
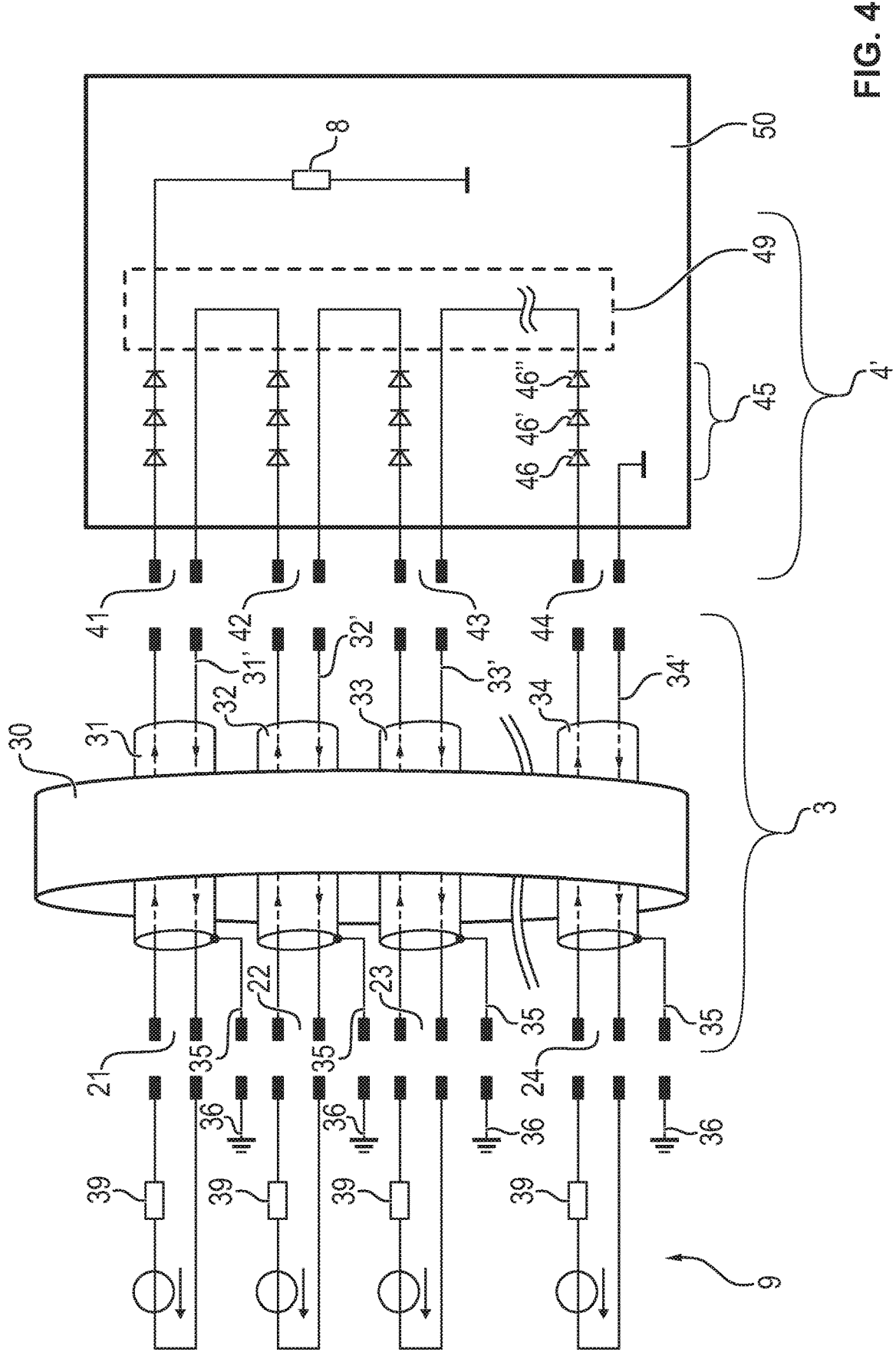
FIG. 4 is a schematic view of a second embodiment with a merging of voltages.

A second alternative form is shown in FIG. 4. It is essentially identical to the embodiment shown in FIG. 3, and identical or similar elements are designated by the same reference numbers. The embodiments of FIGS. 3 and 4 differ essentially in that a differently configured combiner circuit 49 is used. This combiner circuit 49 is configured to connect the individual conductor pairs 31-34 in series and thus to carry out an addition of the voltages. The global voltage thus formed is, in turn, outputted as a load to the electrical device 8.

Figure 5:
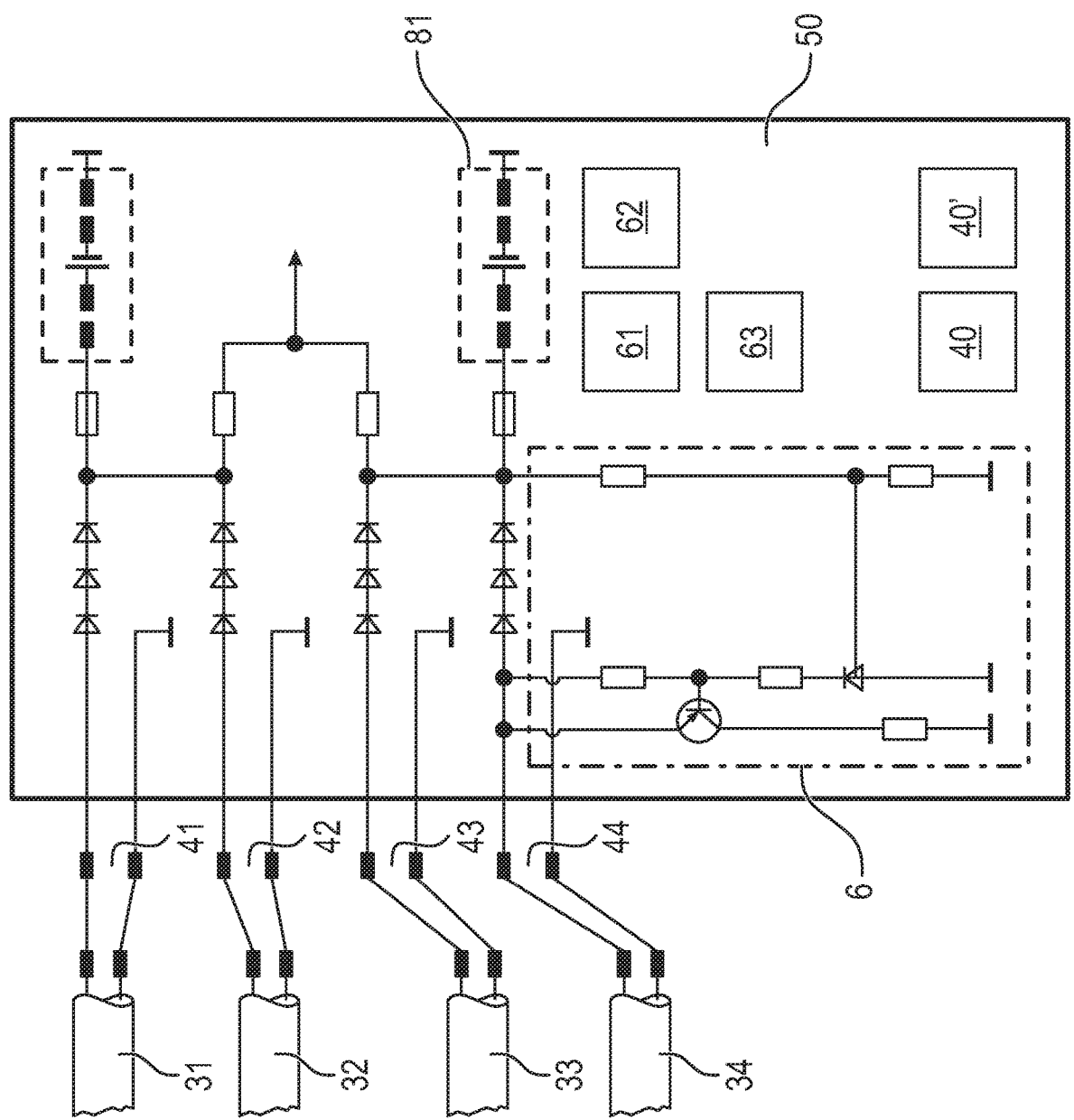
FIG. 5 is a schematic view of a shunt controller for the energy transmission unit.

A shunt controller 6 is provided additionally for the energy transmission unit 1 in the embodiment variant shown in FIG. 5. The shunt controller 6 is shown as an example at the terminals 44 for the conductor pair 34, and it is preferably provided for the other terminals as well. The shunt controller 6 is likewise arranged under a seal 50. It is configured to monitor the voltage in the conductor pair 34 and thus it ensures a controlled voltage release to the electrical device 8 as a load. Another standard type of protection, for example, an encapsulation, for example, a pressure-proof encapsulation, encapsulation according to the standardized type of protection "increased safety," powder filling, oil immersion, and pressurizing, is used in one exemplary embodiment, not shown.

The shunt controller 6 is also suitable as such, in addition to for the supply of the electrical device 8, for charging an integrated battery 81 of the electrical device 8. It preferably interacts to this end with a charge controller 61, which is likewise arranged integrated under the seal 50, as well as with a limiter circuit 62, which ends the charging of the battery 81 when a predefined maximum voltage is reached. Further, a release circuit 63 is optionally provided. It is configured to release the charging, for the protection of the battery, only when the battery has a certain minimum voltage.

Figure 6:
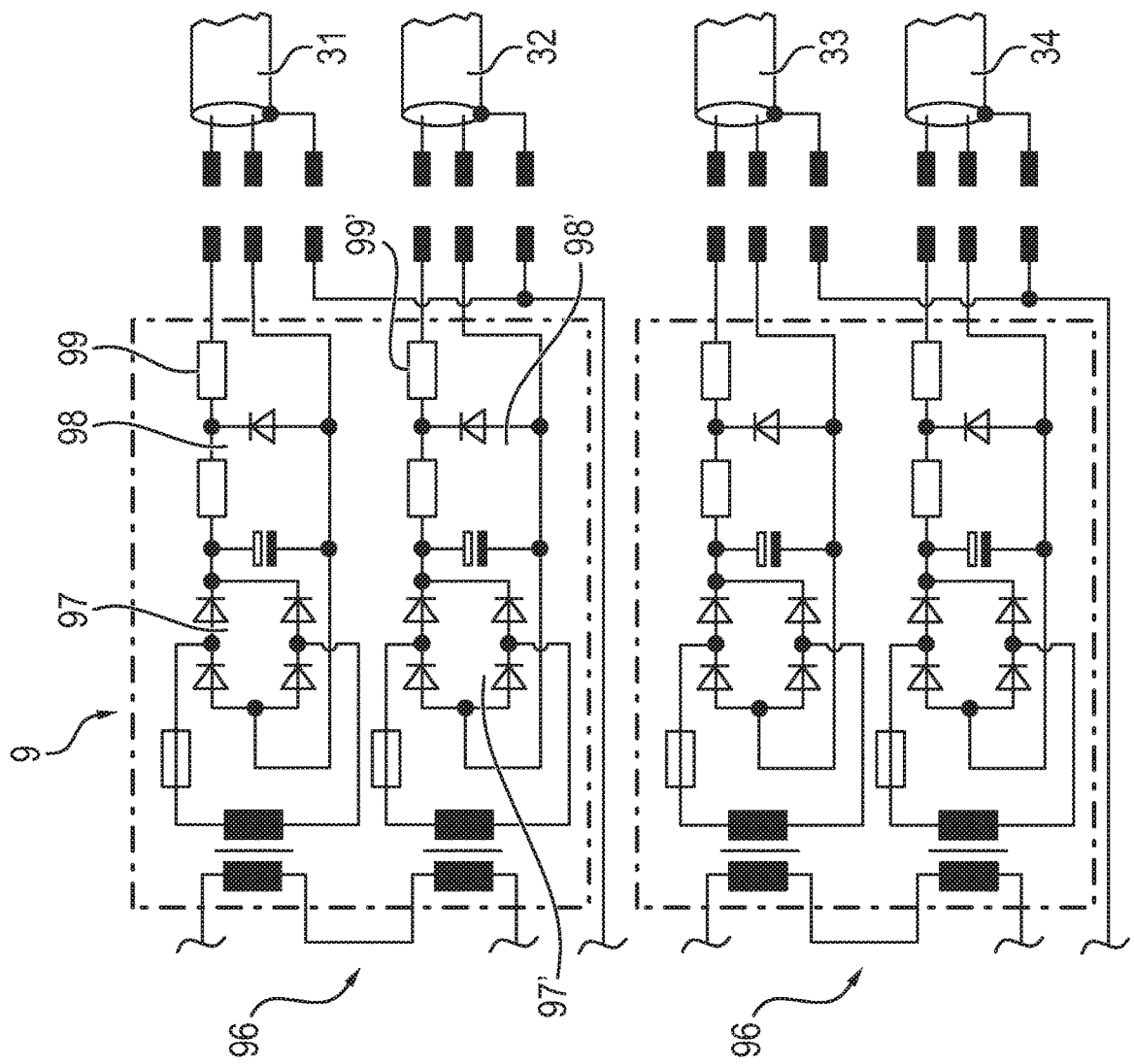
FIG. 6 is a schematic view of an energy source with advantageously configured transformers.

An especially safe configuration of the energy source 9 with transformers 96 is shown in FIG. 6. A total of two transformers 96 with two branches each are shown, of which each branch is connected to one of the conductor pairs 31-34. The transformers 96 have two separate, galvanically isolated secondary windings, to which a rectifier 97, 97' each is connected for transformation into direct voltage. The value of this voltage is regulated via a voltage controller 98, 98', which is followed by a limiting resistor 99, 99' for the current limitation.

Figure 7:
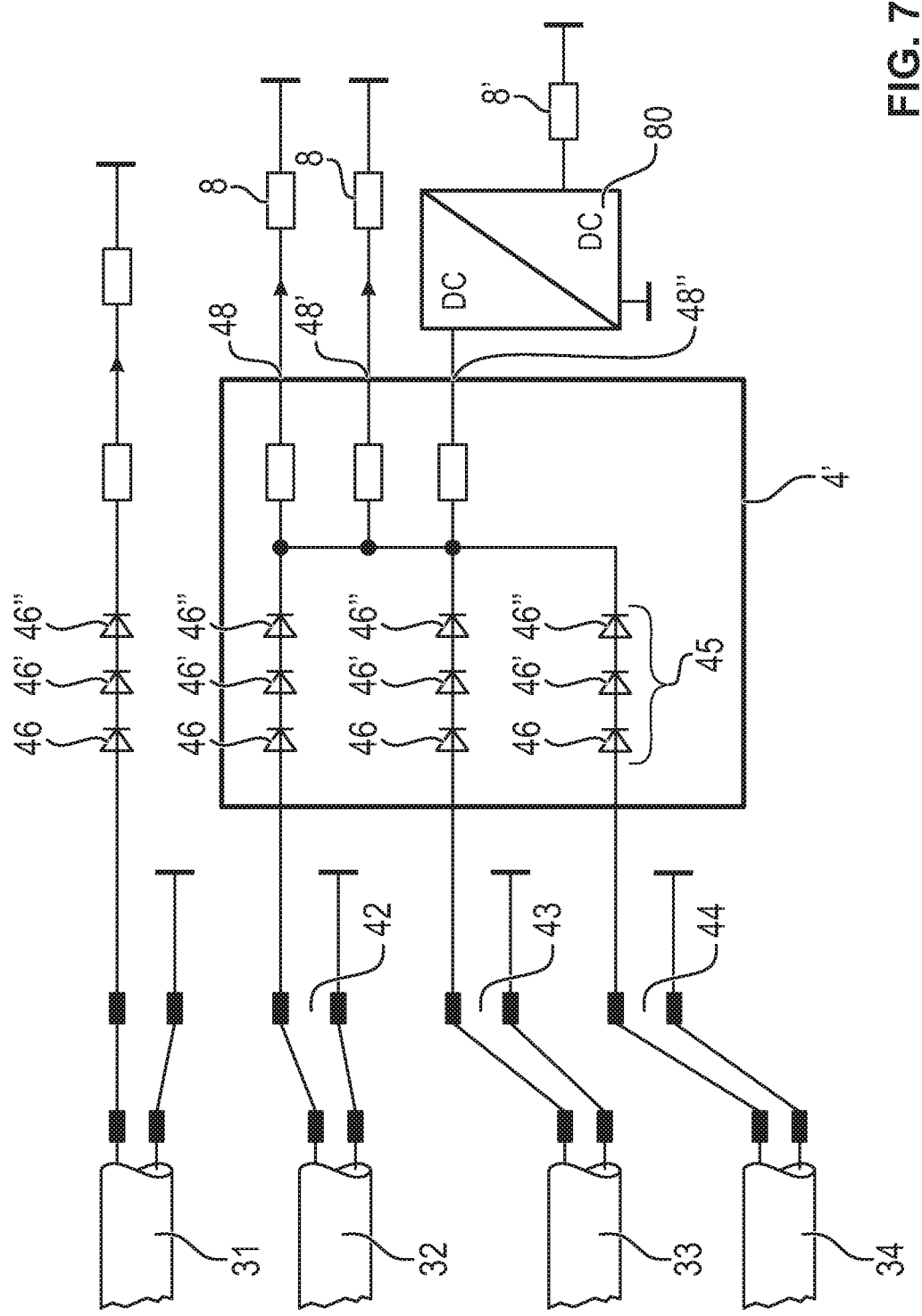
FIG. 7 is a schematic view of an energy transmission unit according to an embodiment variant for supplying different electrical devices.

Another variant for the collector device 4 is shown in FIG. 7. The collector device 4' does not detect all conductor pairs in this exemplary embodiment, but only a part thereof, namely, the conductor pairs 32-34. The global current merged by parallelization is outputted at a plurality of outputs 48, 48', 48", which may be connected differently. For example, an ohmic load is arranged at the outputs 48 and 48', while a DC/DC converter 80 is provided at the output 48" for supplying an electrical device 8' operating at a different voltage level.

While specific embodiments of the invention have been shown and described in detail to illustrate the application of the principles of the invention, it will be understood that the invention may be embodied otherwise without departing from such principles.

What is claimed is:

1. An intrinsically safe energy transfer unit, suitable for an explosion-proof area for supplying an electrical device, the energy transfer unit comprising:
a line connection configured for an intrinsically safe transmission of electric power over the line connection from an energy source comprising a plurality of galvanically isolated individual sources to the electrical device, the line connection being configured as a multiple line with a plurality of galvanically isolated and individually shielded conductor pairs, each of the individually shielded conductor pairs for connection to one of the individual sources;
an explosion-proof jacket;
a collector device provided as an explosion-proof configuration in the explosion-proof jacket, the collector device being connected to the line connection at an electrical device end of the multiple line, the collector device comprising:
terminals, each of the terminals being associated with one of the galvanically isolated conductor pairs, each of the terminals being provided with an uncoupling device, in the collector device, which prevents a reaction to the connected conductor pairs;
a collector device output; and
a combiner circuit configured to combine the transmitted electric power of each of the galvanically isolated conductor pairs to the terminals into a global power, wherein the global power is outputted at an output of the collector device to the electrical device.

2. An intrinsically safe energy transfer unit in accordance with claim 1, wherein the electrical device is made explosion-proof according to a standardized type of protection according to Ex ia or Ex ib.

3. An intrinsically safe energy transfer unit in accordance with claim 1, wherein the collector device and/or the combiner circuit are arranged sealed and/or in a pressure-proof housing.

4. An intrinsically safe energy transfer unit in accordance with claim 1, wherein the uncoupling devices have redundantly configured uncoupling elements connected in a non-fault-liable series connection in respective uncoupling devices.

5. An intrinsically safe energy transfer unit in accordance with claim 1, wherein:
the combiner circuit is configured to merge the current transmitted by the conductor pairs as a parallel circuit; or the combiner circuit is configured to merge the voltages transmitted by the conductor pairs as a series connection.

6. An intrinsically safe energy transfer unit in accordance with claim 1, wherein the conductor pairs are each associated with a current limiting device for limiting current through the conductor.

7. An intrinsically safe energy transfer unit in accordance with claim 1, wherein the collector device is provided with a voltage controller, which is configured to adjust and/or to limit the voltage present at the terminal of a conductor pair to a predefined value.

8. An intrinsically safe energy transfer unit in accordance with claim 7, wherein a voltage controller is assigned to each of the respective terminals.

9. An intrinsically safe energy transfer unit in accordance with claim 1, wherein ground lines of the conductor pairs are insulated in the conductor connection, and are merged only in the collector device or are passed through the collector device, in order to be merged only in the electrical device.

10. An intrinsically safe energy transfer unit in accordance with claim 1, wherein:
the conductor pairs are arranged in a common jacket; or
the line connection is provided with shielding, wherein the shielding is grounded on one side; or
the conductor pairs are arranged in a common jacket and the line connection is provided with shielding, wherein the shielding is grounded on one side.

11. An intrinsically safe energy transmission system comprising:
an energy source; and
an intrinsically safe energy transfer unit, suitable for an explosion-proof area for supplying an electrical device, the energy transfer unit comprising:
a line connection configured for an intrinsically safe transmission of electric power over the line connection from the energy source, the line connection being configured as a multiple line with a plurality of galvanically isolated and individually shielded conductor pairs, each of the individually shielded conductor pairs for connection to the energy source;
an explosion-proof jacket;
a collector device provided as an explosion-proof configuration in the explosion-proof jacket, the collector device being connected to the line connection at an electrical device end of the multiple line, the collector device comprising:
terminals, each of the terminals being associated with one of the galvanically isolated conductor pairs, each of the terminals being provided with an uncoupling device, in the collector device, which prevents a reaction to the connected conductor pairs;
a collector device output; and
a combiner circuit configured to combine the transmitted electric power of each of the galvanically isolated conductor pairs to the terminals into a global power, wherein the global power is outputted at an output of the collector device to the electrical device.

12. An intrinsically safe energy transmission system in accordance with claim 11, wherein the energy source has a plurality of galvanically isolated individual sources, wherein each of the individual sources is assigned to one of the conductor pairs, wherein the energy source and/or the individual sources have an output resistance.

13. An intrinsically safe energy transmission system in accordance with claim 11, wherein the collector device is configured so as to be integrated into the electrical device.

14. An intrinsically safe energy transmission system in accordance claim 11, further comprising an electrical device wherein the electrical device comprises a battery, with an integrated charge controller for the battery.

15. An intrinsically safe energy transmission system in accordance with claim 14, further comprising a limiter circuit configured to end charging of the battery when a predefined threshold value is reached.

16. An intrinsically safe energy transmission system in accordance with claim 11, wherein the collector device and/or the combiner circuit are arranged sealed and/or in a pressure-proof housing.

17. An intrinsically safe energy transmission system in accordance with claim 11, wherein the uncoupling devices have redundantly configured uncoupling elements connected in a series connection in respective uncoupling devices.

18. An intrinsically safe energy transmission system in accordance with claim 11, wherein:
the combiner circuit is configured to merge the current transmitted by the conductor pairs as a parallel circuit; or
the combiner circuit is configured to merge the voltages transmitted by the conductor pairs as a series connection.

19. An intrinsically safe energy transmission system in accordance with claim 11, wherein the conductor pairs are each associated with a current limiting device for limiting current through the conductor.

20. An intrinsically safe energy transfer system in accordance with claim 11, wherein the collector device is provided with a voltage controller assigned to each of the respective terminals, which voltage controller is configured to adjust and/or to limit the voltage present at the terminal of a conductor pair to a predefined value.

* * * * *